United States Patent

Chuang et al.

[11] Patent Number: 6,116,541
[45] Date of Patent: Sep. 12, 2000

[54] AIRCRAFT CABIN OUTFLOW VALVE INCLUDING AFT DOOR MODIFIED FOR NOISE SUPPRESSION

[75] Inventors: Kuang S. Chuang, Cerritos; Yin-Hsiang Ho, Irvine; Steven R. Opdycke, Anaheim, all of Calif.

[73] Assignee: AlliedSignal Inc., Morristown, N.J.

[21] Appl. No.: 09/193,968

[22] Filed: Nov. 18, 1998

Related U.S. Application Data

[60] Provisional application No. 60/073,590, Feb. 3, 1998.

[51] Int. Cl.$^7$ ........................................... B64C 1/14
[52] U.S. Cl. ..................... 244/129.4; 244/1 N; 454/71; 454/76
[58] Field of Search .................. 454/71, 73, 74, 454/76; 251/118, 120, 212; 244/1 N, 75 R, 117 R, 129.4

[56] References Cited

U.S. PATENT DOCUMENTS

| | | |
|---|---|---|
| 3,298,677 | 1/1967 | Anderson . |
| 3,387,804 | 6/1968 | Rhines . |
| 3,426,984 | 2/1969 | Emmons . |
| 3,544,045 | 12/1970 | Butscher . |
| 3,740,006 | 6/1973 | Maher . |
| 5,679,073 | 10/1997 | Hsieh et al. ............................. 454/69 |
| 5,881,995 | 3/1999 | Tse et al. . |

Primary Examiner—Harold Joyce
Attorney, Agent, or Firm—William J. Zak, Jr.

[57] ABSTRACT

An outflow valve for a cabin pressure control system of an aircraft cabin includes an aft door that is modified to disrupt or increase speed of cabin air flowing past the aft door and out of the outflow valve. The aft door may be modified by notches formed in its leading edge. In the alternative, the aft door may be modified by through-holes formed behind the leading edge. The outflow valve also includes a forward door. Bolt heads or a baffle may protrude from an inner surface of the forward door to disrupt or slow down cabin air flowing over the inner surface of the forward door and out of the outflow valve.

19 Claims, 4 Drawing Sheets

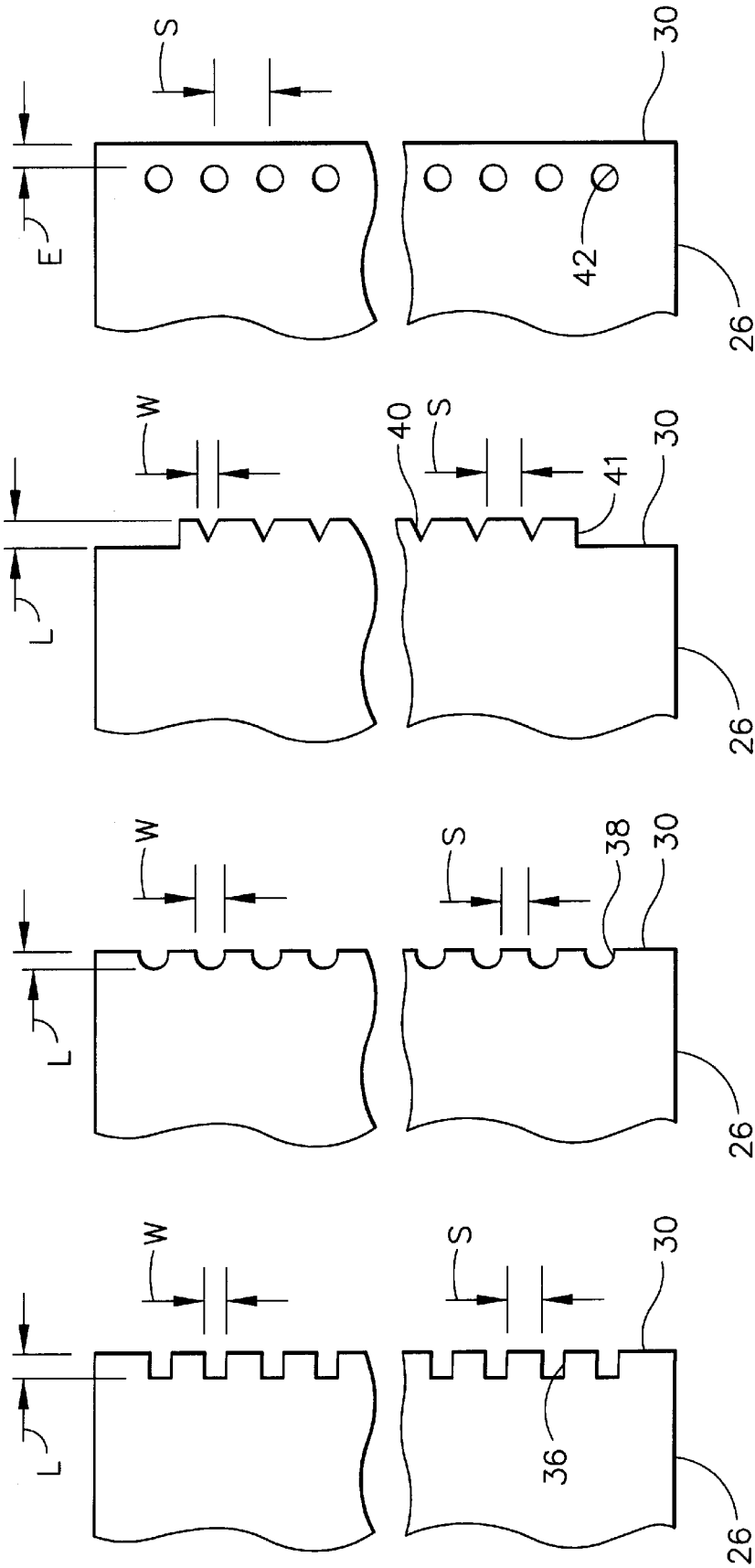

AIRCRAFT CABIN OUTFLOW VALVE INCLUDING AFT DOOR MODIFIED FOR NOISE SUPPRESSION

This application claims the benefit of Provisional Application No. 60/073,590 filed on Feb. 3, 1998.

BACKGROUND OF THE INVENTION

The present invention relates generally to cabin pressure control systems. More specifically, the present invention relates to an outflow valve for a cabin pressure control system.

Commercial aircraft are equipped with cabin pressure control systems for controlling pressure differences between ambient and cabin pressures. During the flight of an aircraft, variations in aircraft altitude cause rapid changes in ambient pressure. The cabin pressure control system maintains the cabin pressure at a relatively comfortable level and makes gradual changes in the cabin pressure to minimize passenger discomfort.

A typical cabin pressure control system for a commercial aircraft includes an outflow valve located at the aft end of the aircraft. For large aircraft such as the Boeing 777, a second outflow valve is located at the forward end. Pressure inside the aircraft cabin can be controlled by regulating the flow of cabin air out of the outflow valve(s).

During operation of the cabin pressure control system, cabin air rushes through the outflow valve(s) and, at certain times, makes noise. Passengers inside the cabin can hear the noise as a single tone. The noise is not deafening; however it can be very irritating to passengers and crew members, especially over a long flight.

Airline carriers have identified a need to suppress the noise generated by the outflow valves, especially for the large commercial aircraft having more than one outflow valve.

SUMMARY OF THE INVENTION

The present invention may be regarded as an outflow valve for a cabin pressure control system. The outflow valve includes a frame; and first and second doors mounted to the frame. Both doors are movable between open and closed positions. The first door has a plurality of spaced-apart passages along its leading edge. At least some of the passages extend from the inner surface of the first door to the outer surface of the first door. In this manner, the first door is modified to suppress noise typically caused by cabin air flowing through a gap between the doors and out of the outflow valve.

BRIEF DESCRIPTION OF THE DRAWINGS

FIGS. 4 to 7 are illustrations of different ways in which a leading edge of an aft door of the outflow valve may be modified to suppress noise;

DETAILED DESCRIPTION OF THE INVENTION

Figure 1:
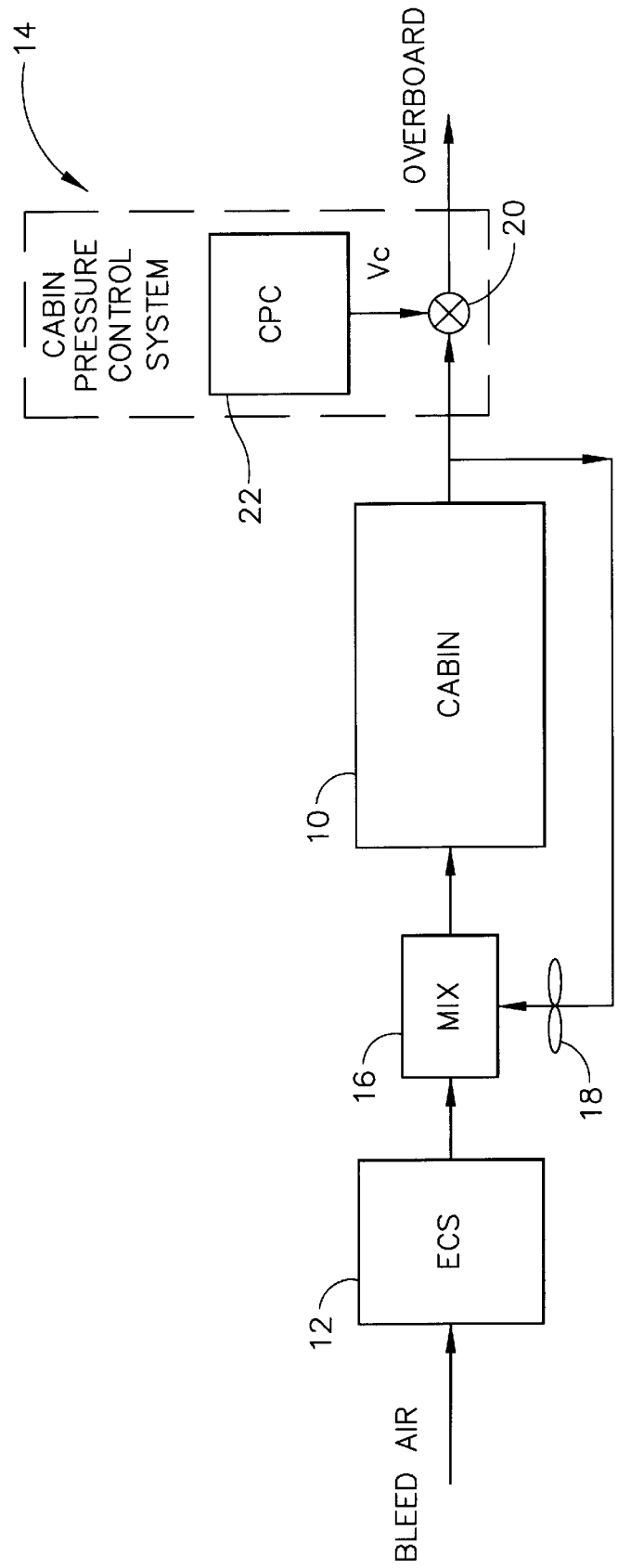
FIG. 1 is an illustration of a cabin pressure control system according to the present invention.

FIG. 1 shows a cabin 10 of an aircraft, an environmental control system 12 for pressurizing the aircraft cabin 10 and a cabin pressure control system 14 for controlling pressure inside the cabin 10. Hot bleed air from a source such as an auxiliary power unit or an aircraft engine is supplied to the environmental control system 12. The environmental control system 12 includes one or more heat exchangers, an air cycle machine and water separation equipment for cooling and conditioning the bleed air.

Cooled, conditioned air leaving the environmental control system 12 is supplied to a mix manifold 16. Inside the mix manifold 16, the cooled conditioned air is mixed with recirculated cabin air. The recirculated cabin air is drawn from the cabin 10 to the mix manifold 16 by a recirculation fan 18. Mixed air leaving the mix manifold 16 is supplied to the aircraft cabin 10.

The cabin pressure control system 14 includes an outflow valve 20 for regulating a flow of cabin air out of the aircraft cabin 10. Air flowing out of the outflow valve 20 is dumped overboard the aircraft. Pressure inside the cabin 10 may be controlled by regulating the flow of cabin air out of the outflow valve 20.

The cabin pressure control system 14 further includes a cabin pressure controller 22 for controlling the outflow valve 20. The cabin pressure controller 22 generates valve commands Vc that cause the outflow valve 20 to regulate the outflow of cabin air. The cabin pressure controller 22 may have a conventional design.

Figure 2:
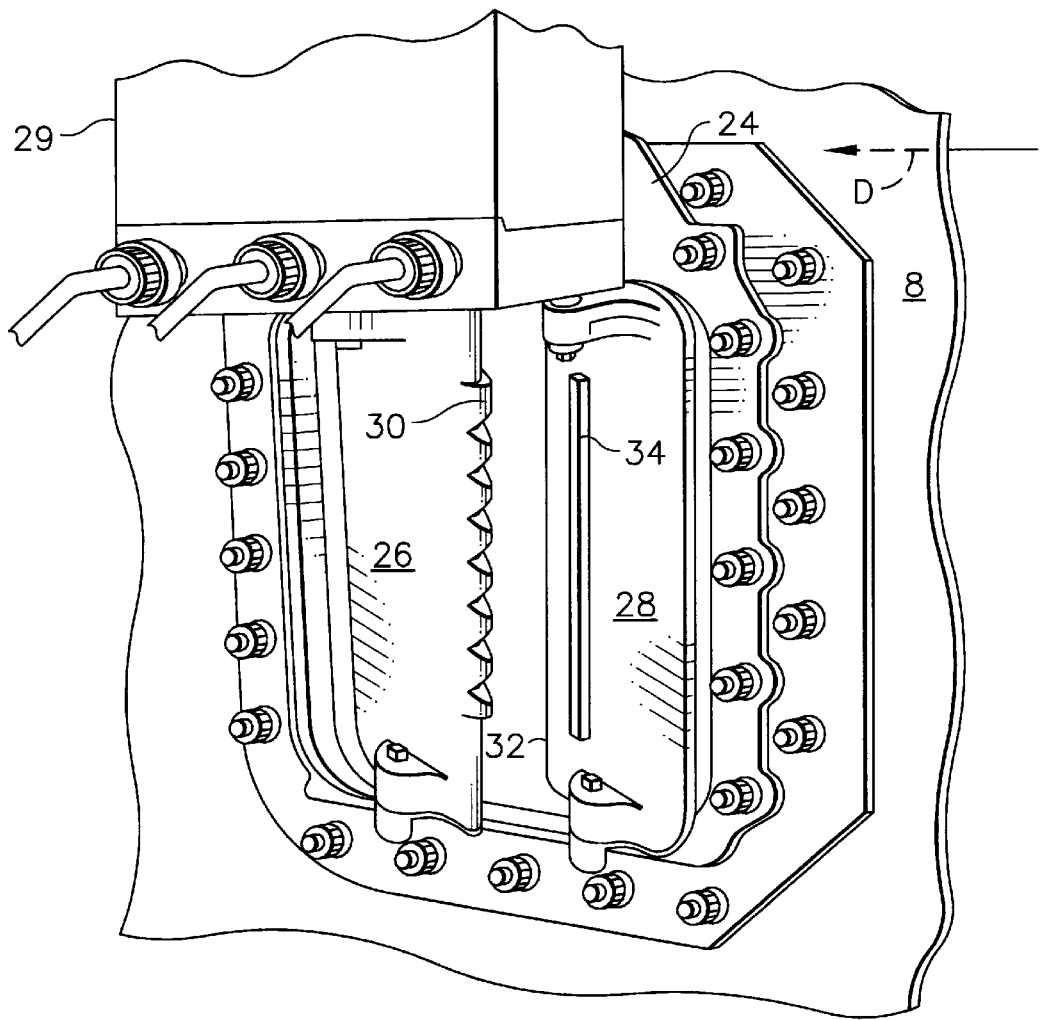
FIG. 2 is an illustration of an outflow valve as viewed from the inside, the outflow valve forming a part of the cabin pressure control system.
Figure 3:
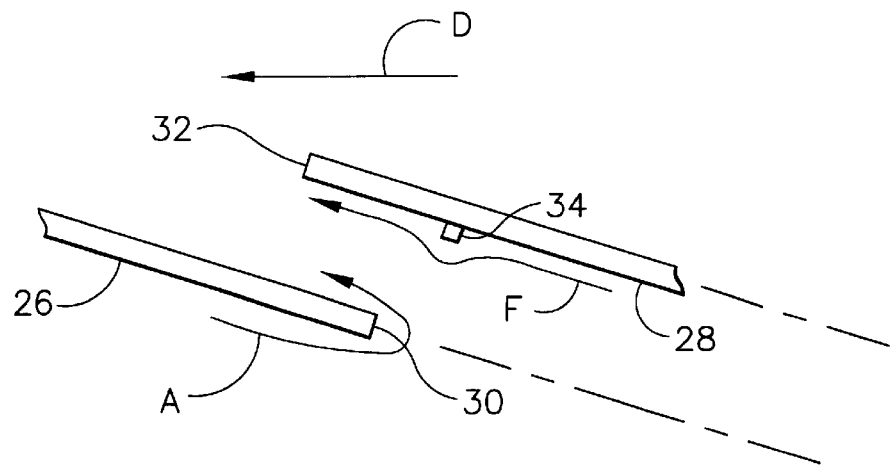
FIG. 3 is an illustration of cabin air flowing out of the outflow valve.

FIGS. 2 and 3 show the outflow valve 20 in greater detail. The outflow valve 20 includes a frame 24 that is mounted to skin 8 of the aircraft. The outflow valve 20 also includes aft and forward doors 26 and 28 that are hinged to the frame 24. The aft door 26 is movable between an open position and a closed position, and the forward door 28 is movable between an open position and a closed position. The aft and forward doors 26 and 28 are linked together by a linkage and opened and closed by an actuator 29. A leading edge of the aft door 26 is indicated by reference numeral 30, and a trailing edge of the forward door 28 is indicated by reference numeral 32.

In response to the valve command Vc, the actuator 29 causes the linkage to move the doors 26 and 28 together between the open and closed positions. When the aircraft is on the ground, both doors 26 and 28 are typically fully open since cabin pressure is not being controlled. During takeoff, both doors 26 and 28 are moved gradually towards the closed position. During flight, both doors 26 and 28 are modulated to regulate the flow of cabin air flowing through the valve 20 and thereby to control pressure inside the cabin 10.

When the aft and forward doors 26 and 28 are opened to the angle shown in FIG. 3, cabin air flows through a gap between the doors 26 and 28 and out of the outflow valve 20, into the ambient air stream in a direction (indicated by arrow D) that is opposite the motion of the aircraft. The air flowing past an inner surface of the aft door 26 tends to slow down as it turns around the leading edge 30 of the aft door 26. The air flowing past an inner surface of the forward door 28 tends to follow a more direct route and, therefore, tends to travel faster than the air flowing past the aft door 26. The air flowing past the inner surface of the aft door 26 is indicated by arrow A. The air flowing past the inner surface of the forward door 28 is indicated by arrow F.

It is believed that this difference in air speed creates audible noise. It has been found that the noise can be suppressed by disrupting or slowing down the flow of the cabin air F flowing over the forward door 28 and disrupting and increasing the speed of cabin air A flowing over the aft door 26.

The air flowing over the aft door 26 can be disrupted, and its speed increased, by modifying the aft door 26 in any of the ways shown in FIGS. 4 to 7. FIGS. 4 to 6 show that the aft door 26 may be modified by forming notches 36, 38 or 40 into the leading edge 30. FIG. 4 shows notches 36 that are polygonally-shaped (e.g., square-shaped, rectangular-shaped), FIG. 5 shows notches 38 that are semi-circularly shaped, and FIG. 6 shows notches 40 that are V-shaped. The notches 36, 38 and 40 may have a width W and length L between one-half of an inch and three-quarters of an inch. The notches 36, 38 or 40 may also be spaced apart by a distance S between one-half of an inch and one inch. The notches 36, 38 or 40 may be spaced apart across at least 80 percent of the entire leading edge 30.

Figure 8:
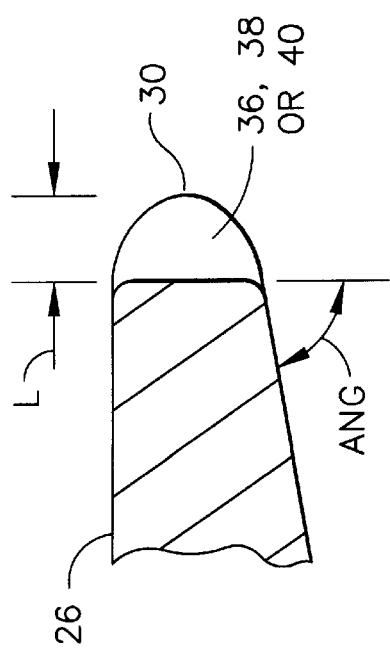
FIG. 8 is an illustration of a partial cross-section of the aft door.

The notches 36, 38 or 40 may be machined directly into the aft door 26. In the alternative, the aft door 26 may be cast, with the notches 36, 38 or 40 being cast along the leading edge 30. The notches 36, 38 or 40 may be formed at any angle ANG relative to the outer surface of the aft door 26 (see FIG. 8).

If the leading edge 30 of the aft door 26 is built up with a plate 41 (see FIG. 6), the notches 40 may be machined in the plate 41 or cast with the plate 41. Thus, the plate 41 would form a part of the leading edge 30 of the aft door 26.

FIG. 7 shows that the aft door 26 may be modified by through-holes 42 drilled near the leading edge 30. The through-holes 42 may have a diameter between one-eighth of an inch and one-half of an inch, they may be spaced apart by between one-half of an inch and one and one-half inches, and they may be located along at least 80 percent of the entire leading edge 30. The distance E from the center to the leading edge 30 is between one-eighth of an inches and one-quarter of an inch. The through-holes 42 may be formed at any angle ANG relative to the surface of the aft door 26.

Figure 9:
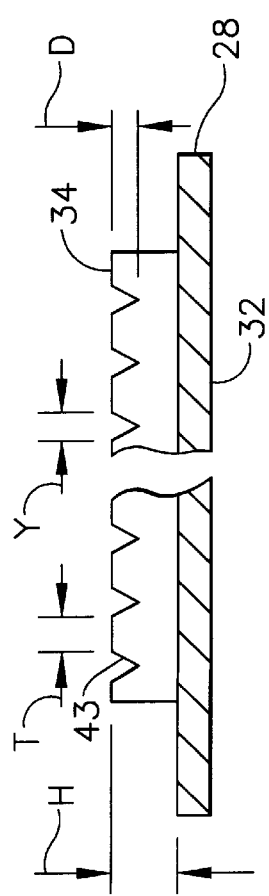

The cabin air flowing over the inner surface of the forward door 28 can be disrupted, or its speed decreased, to further reduce noise. For example, FIG. 9 shows a baffle plate 34 protruding a distance H of about one-half of an inch above an inner surface of the forward door 28. The baffle plate 34 extends along the trailing edge 32 of the forward door 28, with the top of the baffle plate 34 being serrated. The serrations 43 may be straight or V-shaped. The serrations may have a width Y of about one-half of an inch, a depth D of about a quarter of an inch, and a spacing T of about one-half of an inch.

Figure 10:
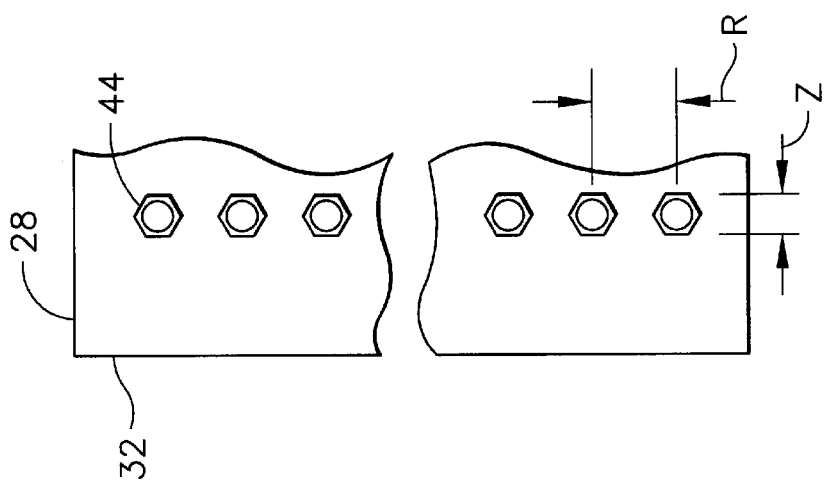
FIGS. 9 and 10 are illustrations of different ways in which a trailing edge of a forward door of the outflow valve may be modified to help suppress noise.

The air flowing over the inner surface of the forward door 28 may be modified instead by a plurality of bolt heads 44 protruding from the inner surface along the trailing edge 32 (see FIG. 10). The bolt heads 44 may have a width Z of about three-quarters of an inch and protrude from the inner surface of the forward door 28 by between one-quarter of an inch and about one-half of an inch. Spacing R between the bolts heads 44 may be between about one and one-half inches and two and one-half inches. The bolt heads 44 may be located about three-quarters of an inch behind the trailing edge so as not to interfere with the aft door 26 when the doors 26 and 28 are in their closed positions.

Thus disclosed is an outflow 20 valve that suppresses noise caused by outgoing cabin air. The outflow valve 20 suppresses noise that can be irritating to passengers and crew members.

The invention is not limited to the specific embodiments disclosed above. For example, the notches are not limited by the geometries and dimensions disclosed herein. Accordingly, the present invention is to be construed according to the claims that follow.

What is claimed is:

1. An outflow valve for a cabin pressure control system, the outflow valve comprising:

a frame;

a first door mounted to the frame, the first door being movable between an open position and a closed position, the first door having inner and outer surfaces, the first door further having a leading edge; and a second door mounted to the frame, the second door being movable between an open position and a closed position;

the first door having a plurality of spaced-apart passages along the leading edge, at least some of the passages extending from the inner surface of the first door to the outer surface of the first door.

2. The valve of claim 1, wherein the passages are notches in the leading edge.

3. The valve of claim 2, wherein the notches are polygonally-shaped.

4. The valve of claim 2, wherein the notches are V-shaped.

5. The valve of claim 2, wherein the notches are semi-circularly shaped.

6. The valve of claim 2, wherein the notches have a width and length between one-half of an inch and three-quarters of an inch.

7. The valve of claim 2, wherein the notches are spaced apart by between one-half of an inch and one inch.

8. The valve of claim 2, wherein the passages extend along at least 80% of the leading edge.

9. The valve of claim 1, wherein the passages are through-holes behind the leading edge, the through holes extending from the inner surface to the outer surface.

10. The valve of claim 9, wherein the through-holes have a diameter between one-eighth of an inch and one-half of an inch and spaced apart by between one-half of an inch and one and one-half inches.

11. The valve of claim 1, wherein the second door has an inner surface and an outer surface, and wherein the valve further includes means, protruding from the inner surface of the second door, for modifying the flow of cabin air over the inner surface of the second door.

12. An aft door for an outflow valve of a cabin pressure control system, the aft door comprising a member having first and second surfaces and a leading edge, the member having a plurality of spaced-apart notches in the leading edge for disrupting and increasing speed of cabin air flowing past the aft door and out of the outflow valve, at least some of the notches extending from the first surface to the second surface.

13. The door of claim 12, wherein the notches have a width and length between one-half of an inch and three-quarters of an inch, and wherein the notches are spaced apart by between one-half of an inch and three-quarters of an inch.

14. The door of claim 12, wherein the notches extend along at least 80% of the leading edge.

15. The door of claim 12, wherein the notches are polygonally-shaped.

16. The door of claim 12, wherein the notches are V-shaped.

17. The door of claim 12, wherein the notches are semi-circularly shaped.

18. A cabin pressure control system for an aircraft cabin, the system comprising:

a cabin pressure controller; and an outflow valve, responsive to valve commands from the cabin pressure controller, for allowing cabin air to flow out of the cabin, the outflow valve including, a frame, an aft door mounted to the frame, and a forward door mounted to the frame;

a leading edge of the aft door having a plurality of spaced-apart notches to disrupt and increase speed of cabin air flowing through a gap between the doors when the doors are opened and the cabin air is flowing out of the outflow valve.

19. The system of claim 18, wherein the forward door has an inner surface, an outer surface and a trailing edge, and wherein the valve door further includes means, protruding from the inner surface, for modifying the flow of cabin air over the inner surface of the forward door.

* * * * *